United States Patent

[11] 3,583,224

| [72] | Inventor | Hisao Futaki |
| | | Musashino-shi, Japan |
| [21] | Appl. No. | 805,193 |
| [22] | Filed | Mar. 7, 1969 |
| [45] | Patented | June 8, 1971 |
| [73] | Assignee | Hitachi, Ltd. |
| | | Tokyo, Japan |
| [32] | Priority | Mar. 21, 1968 |
| [33] | | Japan |
| [31] | | 43/21597 |

[54] TEMPERATURE SENSING DEVICE
7 Claims, 5 Drawing Figs.

[52] U.S. Cl. .................................................. 73/362,
307/310
[51] Int. Cl. ..................................................... G01k 7/00,
G01k 7/24
[50] Field of Search ........................................... 73/362
TSC, 362 R; 307/310

[56] References Cited
UNITED STATES PATENTS

| 3,320,407 | 5/1967 | Holmes | 307/310 |
| 3,383,920 | 5/1968 | Greenly | 307/310 |

*Primary Examiner*—S. Clement Swisher
*Assistant Examiner*—Denis E. Corr
*Attorney*—Craig, Antonelli, Stewart and Hill ABSTRACT: A temperature sensing device for converting temperature to an electric signal using a transistor and a temperature sensitive resistance thermally coupled thereto as temperature transducers. The resistance is electrically connected to the base electrode of said transistor to form a voltage divider with a resistor so that with an increase of temperature the base current of said transistor is increased, thereby deriving an electric signal proportional to the temperature of the temperature sensitive and resistance transistor.

INVENTOR
HISAO FUTAKI

BY Craig, Antonelli, Stewart & Hill

ATTORNEYS

PATENTED JUN 8 1971 3,583,224

INVENTOR
HISAO FUTAKI

BY *Craig, Antonelli, Stewart & Hill*

ATTORNEYS 3,583,224

TEMPERATURE SENSING DEVICE

BACKGROUND OF THE INVENTION

1. Field of the Invention

This invention relates to a temperature sensing device converting temperature to an electric signal, and more particularly to a temperature sensing device having a steep curve of electric signal vs. temperature and generating a large electric signal.

2. Description of the Prior Art

It is well known that a temperature sensitive resistance is used as a transducer of a temperature sensing device in a temperature control system. Since the allowable current of a temperature sensitive resistance is relatively small, the current converted from temperature is also small. So the temperature sensing device using a temperature sensitive resistance requires a DC amplifier with temperature compensation to amplify the resulting signal to the usable power level. However, the use of a number of such temperature compensated DC amplifiers has the disadvantage of raising the cost of products such as freezers.

In a temperature control system with a narrow range of temperature measured it is necessary to steepen the electric signal vs. temperature curve in order to enhance the temperature sensing accuracy.

SUMMARY OF THE INVENTION

One object of this invention is to obtain a temperature sensing device capable of generating a large electric signal without using many amplifiers.

Another object of this invention is to obtain a temperature sensing device having a steep electric signal vs. temperature curve.

Still another object of this invention is to obtain a compact and light temperature sensing device.

The above and other objects and features of the present invention will become apparent from the following description in conjunction with the accompanying drawings.

DESCRIPTION OF THE PREFERRED EMBODIMENTS

Figure 1:
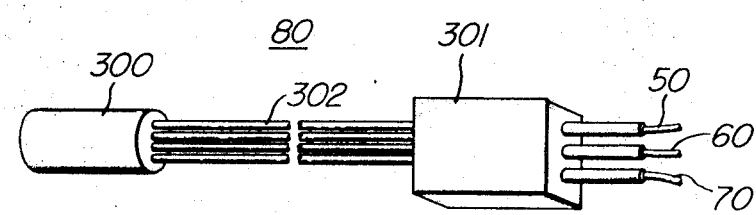
FIG. 1 is a perspective view of a temperature sensing device constructed in accordance with this invention.

In FIG. 1, 80 is a temperature sensing device constructed in accordance with this invention which comprises packages 300, 301 and 302. The package 300 has a transistor and a temperature sensitive resistance forming a temperature transducer. The package 301 comprises resistor bodies, and the package 302 comprises conducting wires connecting electrically the circuits of the packages 300 and 301. The package 300 is made of a material having a good thermal conductivity, e.g., metal. Package 301 has lead wires 50 and 70 for supplying an electric power and a lead wire 60 for deriving a sensing signal.

Figure 2:
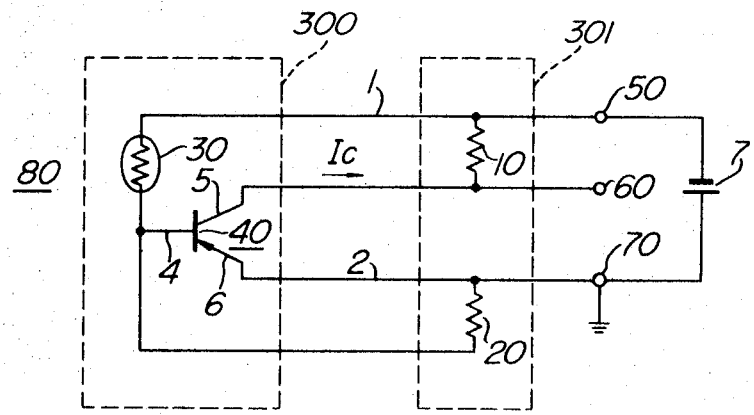
FIG. 2 is an electric wiring diagram of a temperature sensing device shown in FIG. 1 having a thermistor with a negative resistance-temperature coefficient.

The circuit of the above temperature sensing device is as shown in FIG. 2 in which a transistor transducer 40, a thermistor transducer 30 thermally and electrically connected to the base of said transistor and having a negative resistance temperature coefficient, a resistor body 20 connected between the conducting path 2 and the base electrode 4, and a resistor body 10 connected between the collector electrode 5 and the conducting channel 1. A power source 7 for supplying electric power is connected between the terminals 50 and 70. An electric signal proportional to the temperature of thermistor 30 and transistor 40 is derived from the terminal 60.

In the above circuit the thermistor 30 and the resistor body 20 form a voltage divider to supply a bias voltage to the base electrode 4. A temperature rise of thermistor 30 leads to an increase in base voltage so that the base current increases in proportion to the temperature rise. A temperature rise of transistor 40 leads to an increase in the collector current, which depends proportionally on the temperature of transistor 40.

Thus when the thermistor 30 and transistor 40 which are thermally connected experience simultaneously a temperature rise, the collector current Ic increases remarkably as determined by the product of the base current increase by thermistor 30 and the collector current increase by the transistor 40. Therefore, the temperature vs. collector current curve becomes very steep. The collector current varies in proportion to the temperature of thermistor and transistor. A voltage varying similarly to the collector current Ic can be obtained from the signal output means 60.

Figure 4:
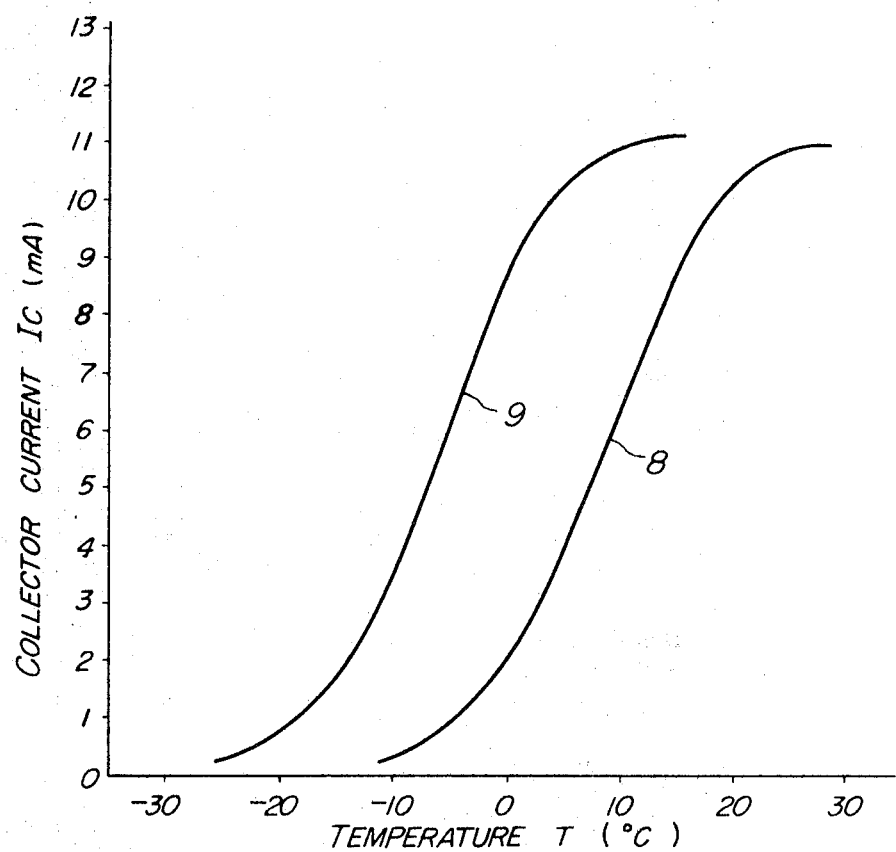
FIG. 4 is a graph showing the relation between the electric signal from the temperature sensing device in FIG. 2 and the ambient temperature of the device.

The above temperature sensing device may be applied to various apparatus whose measured temperature is less than about 80° C. Specifically, the fact that the temperature vs. current curve is steep makes the application to an apparatus requiring high sensitivity very effective. FIG. 4 shows a curve of collector current Ic vs. temperature T as obtained with the following circuit constants. The curve 8 corresponds to the case A and the curve 9 corresponds to the case B of the circuit constants in the following table.

|  | A | B |
| --- | --- | --- |
| Transistor 40 | Hitachi 2SB77 | Hitachi 2SB77. |
| Thermistor 30 | Resistance at 25°C. 6.4 kΩ thermistor constant B=3,390°K. | Resistance at 25°C. 6.4 kΩ thermistor constant B=3,390°K. |
| Resistor 10 | 500 Ω | 500 Ω. |
| Resistor 20 | 1 K.Ω | 3 K.Ω. |
| Power source 7 | 6 volts | 6 volts. |

As evident from FIG. 4, in the case A the temperature vs. current curve shows a sensitivity of 0.5 ma./C.° within the range between 0° C. and 20° C. When the value of the resistor body 20 is 3 KΩ as shown in the case B, the dynamic range of temperature can be brought within the range between −17° C. and 5° C. as shown by the curve 9 and the same sensitivity of about 0.5 ma./C.° is obtained.

According to a temperature sensing device of this invention in which the thermistor and the transistor are simultaneously used as temperature transducers the temperature vs. electric signal curve of the device is uniquely determined by their temperature. Further the amplification function of the transistor yields a large output electric signal.

Therefore, some of the temperature compensated DC amplifiers connected to the temperature sensing device may be omitted.

Figure 5:
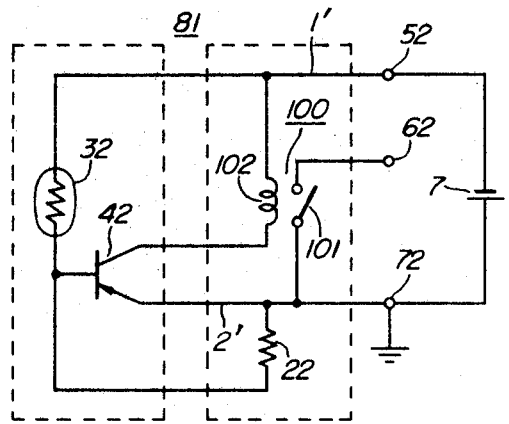
FIG. 5 is an electric wiring diagram of a temperature sensing device having a relay.

Further, the above temperature sensing device can control directly a relay by the variation of the collector current. The manner is as shown in FIG. 5, in which instead of the resistor 10 an electromagnetic coil 102 of relay 100 is connected between the collector of transistor 42 and the power source line 1' so that the current flowing through the coil 102 (collector current) can control the on-off of a contact 101. The coil 102 of the relay having a DC resistance plays the same role as the resistor load 10 for limiting the current. If the DC resistance of the coil 102 is small, a resistor body may be inserted in series to keep the collector current at a prescribed value. The circuit containing the contact 101 is connected through a terminal 62 to a usable circuit.

The use of such a temperature sensing device 81 having a relay requires no other particular temperature compensated amplifier.

Figure 3:
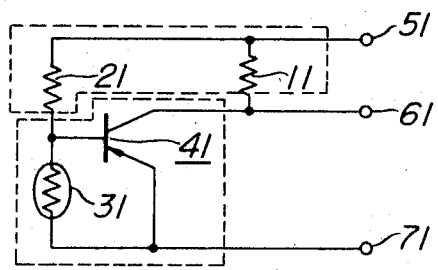
FIG. 3 is an electric wiring diagram of a temperature sensing device having a temperature sensitive resistance with a positive resistance-temperature coefficient.

Although in the above inventive temperature sensing device the temperature sensitive resistance has a negative temperature coefficient, a resistance having a positive temperature coefficient may be used as shown in FIG. 3 in which the thermistor 31 is connected between the emitter and the base of the transistor 41. In this case also the resistance 31 forms a voltage divider with the resistor body 21. An increase in the temperature of resistance 31 increases the base current of transistor 41. Furthermore, it is needless to say that in this invention an NPN transistor may be used as transistor transducer.

Various modifications of this invention other than the above particular embodiments may be made within the scope of this invention without changing its spirit.

I claim:

1. A temperature sensing device comprising a first temperature sensitive transducer formed of a transistor having a base electrode, an emitter electrode, and a collector electrode;
   a pair of conducting lines for supplying power to said transistor;
   a first resistor body having one of its terminals connected to the base of said transistor and the other of its terminals connected to a first conducting line of said pair of conducting lines, the temperature coefficient of the resistance of said resistor body being substantially zero;
   a second transducer formed of a temperature sensitive resistance and thermally coupled to said transistor, one terminal of said second transducer being electrically connected to said base electrode, the other terminal of said second transducer being electrically connected to a second of said conducting lines in such a sense that said second transducer and said first resistor body form a voltage divider between said pair of conducting lines to increase the base current of said transistor with a temperature rise of said second transducer;
   a second resistor body electrically connected between said collector electrode of said transistor and said second conducting line, the temperature coefficient of the resistance of said second resistor body being substantially zero;
   a means for electrically connecting said emitter electrode of said transistor to said first conducting line; and
   a signal output means electrically connected to the collector of said transistor to electric provide a signal representative of the temperature variation of said transistor and said second transducer.

2. A temperature sensing device according to claim 1, wherein said second resistor body comprises an electromagnetic coil of a relay.

3. A temperature sensing device comprising:
   three conducting lines including a pair of conducting lines and an auxiliary conducting line, a first thermally conductive packaging enclosure containing a transistor having an emitter, a base and a collector, and a first temperature sensitive resistance body having a pair of end terminals, one end terminal of the first resistance body being connected to said base of said transistor, the other terminal of said first resistance body being connected to one conducting line of said pair of conducting lines so as to increase the base current of said transistor with a temperature rise of the first resistance body, said emitter of said transistor being connected to the other conducting line of said pair of conducting lines, said collector of said transistor being connected to said auxiliary conducting line; and
   a second packaging enclosure thermally separated from said first packaging enclosure and containing a second and a third resistance body each having a pair of end terminals, one end terminal of said second resistance body being connected to said base of said transistor, the other end terminal of said second resistance body being connected to said other conducting line of said pair of conducting lines, one end terminal of said third resistance body being connected to said one conducting line of said pair of conducting lines and the other end terminal of said third resistance body being connected to said auxiliary conducting line.

4. A temperature sensing device according to claim 3, wherein said transistor is a PNP transistor, said first resistance body having a negative resistance-temperature coefficient.

5. A temperature sensing device comprising:
   a first temperature sensitive transducer formed of a transistor having a base electrode, an emitter electrode, and a collector electrode;
   a pair of conducting lines for supplying power to said transistor
   a first resistor body having one of its terminals connected to the base of said transistor and the other of its terminals connected to a first conducting line of said pair of conducting lines, the temperature coefficient of the resistance of said resistor body being substantially zero;
   a second transducer formed of a temperature sensitive resistance having a negative resistance-temperature coefficient and thermally coupled to said transistor, one terminal of said second transducer being electrically connected to said base electrode, the other terminal of said second transducer being electrically connected to a second of said conducting lines in such a sense that said second transducer and said first resistor body form a voltage divider between said pair of conducting lines to increase the base current of said transistor with a temperature rise of said second transducer;
   a second resistor body electrically connected between said collector electrode of said transistor and said second conducting line, the temperature coefficient of the resistance of said second resistor body being substantially zero;
   a means for electrically connecting said emitter electrode of said transistor to said first conducting line; and
   a signal output means electrically connected to the collector of said transistor to provide a signal representative of the temperature variation of said transistor and said second transducer.

6. A temperature sensing device comprising:
   a first temperature sensitive transducer formed of a transistor having a base electrode, an emitter electrode, and a collector electrode;
   a pair of conducting lines for supplying power to said transistor;
   a first resistor body having one of its terminals connected to the base of said transistor and the other of its terminals connected to a first conducting line of said pair of conducting lines, the temperature coefficient of the resistance of said resistor body being substantially zero;
   a second transducer formed of a temperature sensitive resistance having a positive resistance-temperature coefficient and thermally coupled to said transistor, one terminal of said second transducer being electrically connected to said base electrode, the other terminal of said second transducer being electrically connected to a second of said conducting lines in such a sense that said second transducer and said first resistor body form a voltage divider between said pair of conducting lines to increase the base current of said transistor with a temperature rise of said second transducer;
   a second resistor body electrically connected between said collector electrode of said transistor and said first conducting line, the temperature coefficient of the resistance of said second resistor body being substantially zero;
   a means for electrically connecting said emitter electrode of said transistor to said second conducting line; and
   a signal output means electrically connected to the collector of said transistor to provide a signal representative of the temperature variation of said transistor and said second transducer.

7. A temperature sensing device comprising:
   three conducting lines including a pair of conducting lines and an auxiliary conducting line, a first thermally conductive packaging enclosure containing a transistor having an emitter, a base and a collector, and a first temperature sensitive resistance body having a positive resistance-temperature coefficient and having a pair of end terminals, one end terminal of the first resistance body being connected to said base of said transistor, the other terminal of said first resistance body being connected to one conducting line of said pair of conducting lines so as to increase the base current of said transistor for a temperature rise of the first resistance body, said emitter of said transistor being connected to said one conducting line of said pair of conducting lines, said collector of said transistor being connected to said auxiliary conducting line; and a second packaging enclosure thermally separated from said first packaging enclosure and containing a second and a third resistance body each having a pair of end terminals, one end terminal of said second resistance body being connected to said base of said transistor, the other end terminal of said second resistance body being connected to the other conducting line of said pair of conducting lines, one end terminal of said third resistance body being connected to said other conducting line of said pair of conducting lines and the other end terminal of said third resistance body being connected to said auxiliary conducting line.